(12) United States Patent
Suzuki et al.

(10) Patent No.: US 10,024,980 B2
(45) Date of Patent: Jul. 17, 2018

(54) RADIATION IMAGING APPARATUS AND RADIATION IMAGING SYSTEM

(71) Applicant: CANON KABUSHIKI KAISHA, Tokyo (JP)

(72) Inventors: Masataka Suzuki, Tokyo (JP); Hidetomo Suwa, Machida (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/669,194

(22) Filed: Mar. 26, 2015

(65) Prior Publication Data
US 2015/0293237 A1 Oct. 15, 2015

(30) Foreign Application Priority Data

Apr. 9, 2014 (JP) ................................. 2014-080492

(51) Int. Cl.
*G01T 1/20* (2006.01)
*G03B 42/04* (2006.01)

(52) U.S. Cl.
CPC ............ *G01T 1/2018* (2013.01); *G03B 42/04* (2013.01)

(58) Field of Classification Search
CPC ................................................... G01T 1/2018
See application file for complete search history.

(56) References Cited

U.S. PATENT DOCUMENTS

| 8,360,638 B2 | 1/2013 | Ohta et al. .................. 378/190 |
| 8,592,774 B2 | 11/2013 | Suwa et al. ............. 250/370.09 |
| 8,744,044 B2 | 6/2014 | Suwa et al. ..................... 378/62 |
| 8,969,820 B2 | 3/2015 | Suwa et al. ............. 250/370.09 |
| 2003/0026382 A1 | 2/2003 | Takeda ............................ 378/19 |
| 2004/0211908 A1 | 10/2004 | Sato et al. ............... 250/370.09 |
| 2004/0211909 A1 | 10/2004 | Watanabe ................ 250/370.11 |

(Continued)

FOREIGN PATENT DOCUMENTS

| CN | 1098575 A | 2/1995 |
| CN | 101185575 A | 5/2008 |

(Continued)

OTHER PUBLICATIONS

Examination Report dated Apr. 13, 2016 in counterpart British patent application GB1505167.5.

(Continued)

*Primary Examiner* — Marcus Taningco
(74) *Attorney, Agent, or Firm* — Fitzpatrick Cella Harper and Scinto (57) ABSTRACT

A radiation imaging apparatus includes: a radiation detection panel; an electrical component electrically connected to the radiation detection panel; and a housing for housing the radiation detection panel including a top configured to cause the radiation to enter the housing and impinge on the radiation detection panel, and a bottom arranged on a side opposite to the top. An inner surface of the bottom on a side of the radiation detection panel includes a supporting surface configured to support the radiation detection panel. A concave portion defined by a part of an outer surface of the bottom is formed on a side of the bottom opposite to the side of the radiation detection panel i.e. on the outside of the housing. The electrical component is arranged in the concave portion.

20 Claims, 6 Drawing Sheets

(56) References Cited

U.S. PATENT DOCUMENTS

| | | | |
|---|---|---|---|
| 2007/0272873 A1* | 11/2007 | Jadrich | G01T 1/20 |
| | | | 250/370.11 |
| 2008/0118034 A1 | 5/2008 | Aoyagi | 378/182 |
| 2009/0014659 A1 | 1/2009 | Hennessy et al. | |
| 2009/0202044 A1 | 8/2009 | Wu | 378/189 |
| 2010/0258730 A1 | 10/2010 | Sumi | |
| 2012/0049075 A1 | 3/2012 | Nariyuki | 250/368 |
| 2012/0153172 A1* | 6/2012 | Sumi | G01T 1/244 |
| | | | 250/369 |
| 2012/0161026 A1 | 6/2012 | Kitano et al. | 250/394 |
| 2012/0195409 A1 | 8/2012 | Suwa | 378/189 |
| 2012/0312997 A1 | 12/2012 | Iwakiri et al. | 250/366 |
| 2012/0314838 A1* | 12/2012 | Oyaizu | G03B 42/047 |
| | | | 378/62 |
| 2013/0003932 A1 | 1/2013 | Nishino | 378/91 |
| 2013/0051531 A1* | 2/2013 | Kobayashi | A61B 6/4233 |
| | | | 378/98 |
| 2013/0075609 A1* | 3/2013 | Sato | A61B 6/4283 |
| | | | 250/336.1 |
| 2013/0077762 A1* | 3/2013 | Noguchi | A61B 6/4405 |
| | | | 378/189 |
| 2013/0077763 A1 | 3/2013 | Tagawa | 378/189 |
| 2015/0320373 A1* | 11/2015 | Rieuvernet | A61B 6/4283 |
| | | | 378/189 |

FOREIGN PATENT DOCUMENTS

| | | |
|---|---|---|
| CN | 102113890 A | 7/2011 |
| CN | 102551757 A | 7/2012 |
| CN | 102667620 A | 9/2012 |
| CN | 102727227 A | 10/2012 |
| CN | 102846327 A | 1/2013 |
| DE | 10 2012 216 120 A1 | 5/2013 |
| EP | 1 437 623 A1 | 7/2004 |
| FR | 2918768 A1 | 1/2009 |
| GB | 2488732 | 9/2012 |
| JP | 2002-014170 | 1/2002 |
| JP | 2004-321568 | 11/2004 |
| JP | 2006-250729 | 9/2006 |
| JP | 2007-067151 | 3/2007 |
| JP | 2008-129231 | 6/2008 |
| JP | 3848288 | 11/2008 |
| JP | 2010-276687 | 12/2010 |
| JP | 2010-281753 | 12/2010 |
| JP | 2012-047627 | 3/2012 |
| JP | 2012-181238 | 9/2012 |
| JP | 2013-073111 | 4/2013 |
| JP | 2013-156100 | 8/2013 |

OTHER PUBLICATIONS

Combined Search and Examination Report dated Sep. 28, 2015 in counterpart British patent application 1505167.5.

German Office Action dated Sep. 27, 2016, in counterpart German patent application 102015105318.7, with translation.

Office Action dated May 27, 2017 in counterpart P.R. China patent application 201510164218.5, with translation.

* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

Radiation imaging apparatuses that irradiate a target object with a radiation and detect the intensity distribution of the radiation having passed through the target object to obtain the radiation image of the target object are widely used in general for industrial non-destructive inspection and medical diagnosis. Recently, an imaging apparatus has been developed which captures a radiation digital image by using a radiation detection panel configured to convert, into electric information by a sensor, light emitted in correspondence with a radiation entering a scintillator. Such an imaging apparatus can provide an output image instantaneously.

Since such an imaging apparatus can image a wide range of portions quickly, a low-profile, lightweight portable imaging apparatus called an electronic cassette has been developed. Especially in recent years, a wireless imaging apparatus requiring no cable connection has been developed to improve portability. An imaging apparatus of this type is configured to be able to contain or attach a rechargeable battery serving as a power source for supplying power, and has higher portability than a conventional imaging apparatus.

At the time of imaging, the imaging apparatus might receive an impact force or another external force. A glass substrate constituting a radiation detection panel may be broken by the external force. If the glass substrate is broken, it becomes very difficult to capture a radiation image clearly. It is thus advisable to protect the imaging apparatus satisfactorily so as to prevent the breakage of the glass substrate. To operation the internal radiation detection function of the imaging apparatus even in such a situation, the imaging apparatus needs to consider strength, vibration resistance, and shock resistance. At the same time, downsizing, thinning, and weight-saving are requested of the imaging apparatus in order to facilitate handling, improve portability, and enable quick imaging.

For this purpose, imaging apparatuses take various configurations. An imaging apparatus disclosed in Japanese Patent No. 3848288 aims at high rigidity and weight-saving by supporting a radiation detection panel using a base having concave portions, and including the concave portions on the inner surface of the bottom of a housing via a reinforcing plate and a support. An imaging apparatus disclosed in Japanese Patent Laid-Open No. 2010-281753 aims at high rigidity and weight-saving by supporting a radiation detection panel on the inner surface of the bottom of a housing using a base and a structure thereon.

An imaging apparatus disclosed in Japanese Patent Laid-Open No. 2012-181238 aims to increase the strength of the imaging apparatus by constituting a housing with a monocoque structure of a fiber-reinforced resin or the like. In the imaging apparatus disclosed in Japanese Patent Laid-Open No. 2012-181238, a radiation detection panel is held by buffer members attached to two lid members that constitute the side walls of the housing. Japanese Patent Laid-Open No. 2012-181238 discloses a structure in which the radiation detection panel is held by an adhesive layer to the inner wall of the top of the housing. In this manner, downsizing, thinning, and weight-saving of the imaging apparatus have conventionally been performed by various structures.

However, the above-described related arts have several problems. The imaging apparatuses disclosed in Japanese Patent No. 3848288 and Japanese Patent Laid-Open No. 2010-281753 require a base and a support that support a radiation detection panel, in addition to a housing that contains the radiation detection panel. Although the imaging apparatus disclosed in Japanese Patent Laid-Open No. 2012-181238 has a structure in which the housing serving as an exterior ensures rigidity, it additionally requires a supporting member that supports the radiation detection panel within the housing. The supporting member of the radiation detection panel can be a relatively rigid member. However, if the supporting member is satisfactorily rigid, weight-saving becomes difficult. To solve this, rigidity is improved by fastening the supporting member and the housing by a screw or the like, or bringing them into contact. In such a case, however, it tends to be difficult to arrange a control board, rechargeable battery, and the like that need to be stored in the imaging apparatus.

For example, in Japanese Patent Laid-Open No. 2010-281753, a control board that controls the radiation detection panel is arranged outside the radiation detection panel when viewed from the radiation incident direction. In this case, it is hard to employ a so-called slim bezel structure that decreases the distance between the housing and glass substrate of the imaging apparatus that protect the radiation detection panel. Therefore, downsizing of the imaging apparatus becomes difficult.

Japanese Patent Laid-Open No. 2012-181238 introduces an arrangement in which a supporting member that supports the radiation detection panel in the housing is omitted by adhering the radiation detection panel to the inner wall of the top of the housing on the radiation incident surface side. In this arrangement, necessary rigidity needs to be ensured at the top of the housing. A radiation emitted by the radiation source passes through a subject and the top of the housing and then is detected by the radiation detection panel. The top of the housing often has a simple plate-like shape with a uniform plate thickness so that the top does not remain as an artifact in a captured image. It is therefore difficult to improve rigidity by changing the shape of the member, for example, giving a ribbed structure to the top of the housing in order to ensure necessary rigidity. To ensure necessary rigidity, the plate thickness is simply increased, and downsizing and weight-saving of the overall imaging apparatus become difficult. When the radiation detection panel is adhered to the inner surface of the top of the housing, if a load such as an external force is applied to the housing, the external force is readily transmitted to the radiation detection panel, increasing the load. Further, upon application of the external force, a high tensile stress is readily applied to the radiation detection panel owing to a bending stress. This tensile stress readily becomes a cause of breaking the glass substrate constituting the sensor substrate of the radiation detection panel.

SUMMARY OF THE INVENTION

The present invention provide a radiation imaging apparatus advantageous for protection and downsizing of a radiation detection panel.

The present invention in its one aspect provides a radiation imaging apparatus comprising: a radiation detection panel configured to detect radiation; an electrical component electrically connected to the radiation detection panel; and a housing configured to house the radiation detection panel, the housing including a first portion configured to allow the radiation to enter the housing and irradiate the radiation detection panel, and an opposite portion, wherein: an inner surface of the opposite portion includes a supporting surface configured to support the radiation detection panel; a part of an outer surface of the opposite portion comprises a concave portion positioned at opposite side to the supporting surface; and the electrical component is arranged in the concave portion.

Further features of the present invention will become apparent from the following description of exemplary embodiments with reference to the attached drawings.

DESCRIPTION OF THE EMBODIMENTS

[First Embodiment]

Figure 1A:
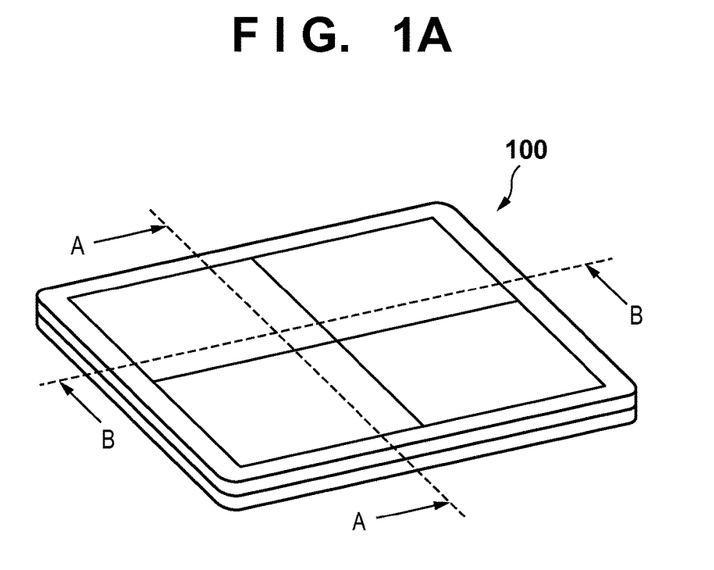
FIGS. 1A and 1B are views showing the outer appearance of a radiation imaging apparatus according to the first embodiment.
Figure 1B:
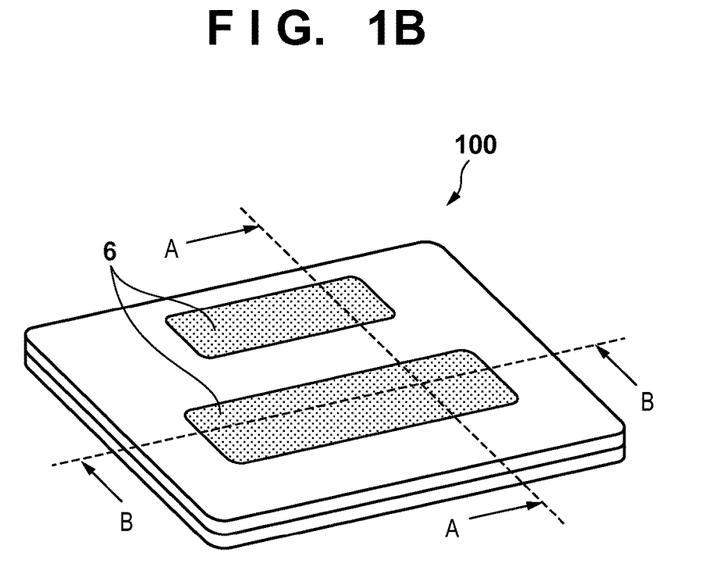
Figure 2:
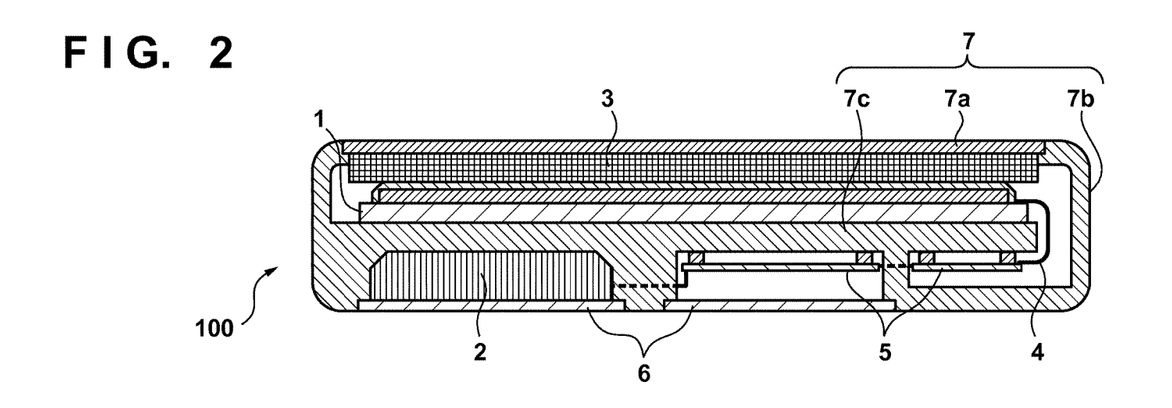
FIG. 2 is a longitudinal sectional view showing the radiation imaging apparatus according to the first embodiment.
Figure 3:
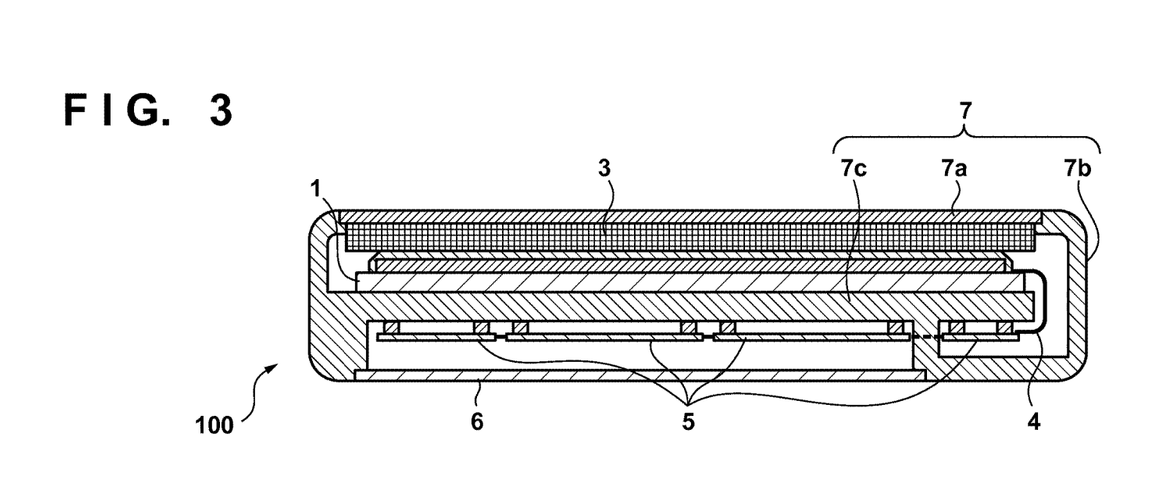
FIG. 3 is a cross-sectional view showing the radiation imaging apparatus according to the first embodiment.

FIGS. 1A and 1B show the outer appearance of a radiation imaging apparatus (imaging apparatus) 100 that contains a radiation detection panel 1. FIG. 1A is a view showing an outer appearance of the imaging apparatus 100 when viewed from the radiation incident surface side. FIG. 1B is a view showing an outer appearance of the imaging apparatus 100 when viewed from a side opposite to the radiation incident surface side. FIG. 2 is a longitudinal sectional view showing the imaging apparatus 100 in FIGS. 1A and 1B taken along a line A-A. FIG. 3 is a cross-sectional view showing the imaging apparatus 100 in FIGS. 1A and 1B taken along a line B-B. Generally in the imaging apparatus 100, a radiation that has been emitted by a radiation source (not shown) and has passed through a subject is detected by photoelectric converters (sensors) arrayed in a two-dimensional matrix. An image acquired by the imaging apparatus 100 is transferred to the outside, displayed on a monitor or the like, and used for diagnosis or the like.

The radiation detection panel 1 includes a sensor substrate prepared by arranging many photoelectric converters (sensors) on a substrate, a scintillator layer arranged on the sensor substrate, and a protection film for the scintillator layer. The radiation detection panel 1 is connected to a flexible circuit board 4. A control board 5 that reads out a detection signal from the radiation detection panel 1 and processes the readout detection signal is connected to the flexible circuit board 4. As shown in FIG. 2, the imaging apparatus 100 according to the first embodiment includes a rechargeable battery 2 for supplying necessary power, but power may be supplied from the outside by wired connection. The control board 5 and the rechargeable battery 2 will be generally called electric components altogether.

The imaging apparatus 100 according to the first embodiment adopts the following arrangement shown in FIGS. 1A and 1B in order to implement weight saving, thinning, and downsizing. The imaging apparatus 100 is shown in FIGS. 2 and 3 to include a housing (exterior) 7 that houses the radiation detection panel 1. The housing 7 includes a top 7a (also referred to hereinbelow as a first portion) for causing a radiation emitted by the radiation source to enter the radiation detection panel 1, a bottom 7c (also referred to hereinbelow as an opposite portion) that is positioned on a side opposite to the radiation incident (i.e. the top) side and supports the radiation detection panel 1, and a side (wall) 7b that connects the top 7a and the bottom 7c. Of the inner surface of the bottom 7c on the side facing the radiation detection panel 1, at least a supporting surface that supports the region of the effective pixels of the radiation detection panel 1 is formed to be flat. The region of the effective pixels of the radiation detection panel 1 is an imaging region where a radiation image is actually acquired. The bottom 7c is arranged on a side opposite to the top 7a with the radiation detection panel 1 arrangeable between them.

To hold electric components such as the control board 5 and the rechargeable battery 2, the bottom 7c has at least one concave portion or recess in the outer surface on a side opposite to the side facing the radiation detection panel 1. In other words, there are recesses or concave portions for holding electrical components on the outside of the bottom portion 7c. At least one concave portion is defined by part of the outer surface of the bottom 7c that is exposed outside the housing 7. This makes it easy to employ a slim bezel because no electric component is arranged outside (i.e. surrounding or overlapping with) the radiation detection panel 1 when viewed from the radiation incident direction (i.e. the top). In the first embodiment, the top 7a is constituted by a member different from the side 7b and the bottom 7c, as shown in FIGS. 2 and 3. The top 7a is made of a carbon fiber-reinforced resin or the like in terms of transmission of a radiation, rigidity, and the like, but is not limited to this. To the contrary, the side 7b and the bottom 7c are made of a fiber-reinforced resin, a fiber-reinforced metal, an aluminum alloy, a magnesium alloy, or the like in order to ensure rigidity for satisfactorily protecting the radiation detection panel 1.

The bottom 7c is constituted to be higher in bending rigidity than the top 7a. This can relax the load of a tensile stress generated by a bending stress to a glass substrate constituting the sensor substrate. A buffer member 3 for absorbing a shock is interposed between the radiation detection panel 1 and the top 7a in order to protect the radiation detection panel 1 from an impact force from the radiation incident side. With this structure, the imaging apparatus 100 according to the first embodiment can ensure a structure for arranging necessary components in the imaging apparatus 100 while achieving the ensuring of satisfactory rigidity, and weight-saving, thinning, and downsizing.

In the first embodiment, as shown in FIGS. 2 and 3, access covers (cover members) 6 for forming a concave portion as a closed space are arranged to cover the concave portions so that electrical safety can be ensured, and electrical components such as the control board 5 and the rechargeable battery 2 can be replaced. Each access cover 6 is fastened to the bottom 7c of the housing 7 by, for example, snug fitting, but is detachable. To maintain the water resistance of the concave portion, a seal member may be arranged at the contact portion between the bottom 7c and the access cover 6. Further, the access covers 6 may be integrated with the control board 5 and rechargeable battery 2 arranged in the formed closed spaces.

To suppress the influence of a warp or the like caused by heat, the access cover 6 can be made of the same member or at least of the same material as that of the bottom 7c. To enable wireless communication between the imaging apparatus 100 and the outside, the access cover 6 and the housing 7 may be partially made of a non-conductive material. The access cover 6 can be implemented by a material such as a non-conductive resin, or a fiber-reinforced resin (for example, a carbon fiber-reinforced resin), but is not limited to this. Rigidity can be further improved by fixing the access cover 6 to the bottom 7c, and further weight-saving can be achieved.

In the first embodiment, rigidity is ensured in all the members by these configurations. While achieving the ensuring of rigidity, and weight saving, thinning, and downsizing, a structure for arranging electric components can be ensured. Further weight saving, thinning, and downsizing of the imaging apparatus 100, which are difficult in the related art, can be performed.

[Second Embodiment]

Figure 4:
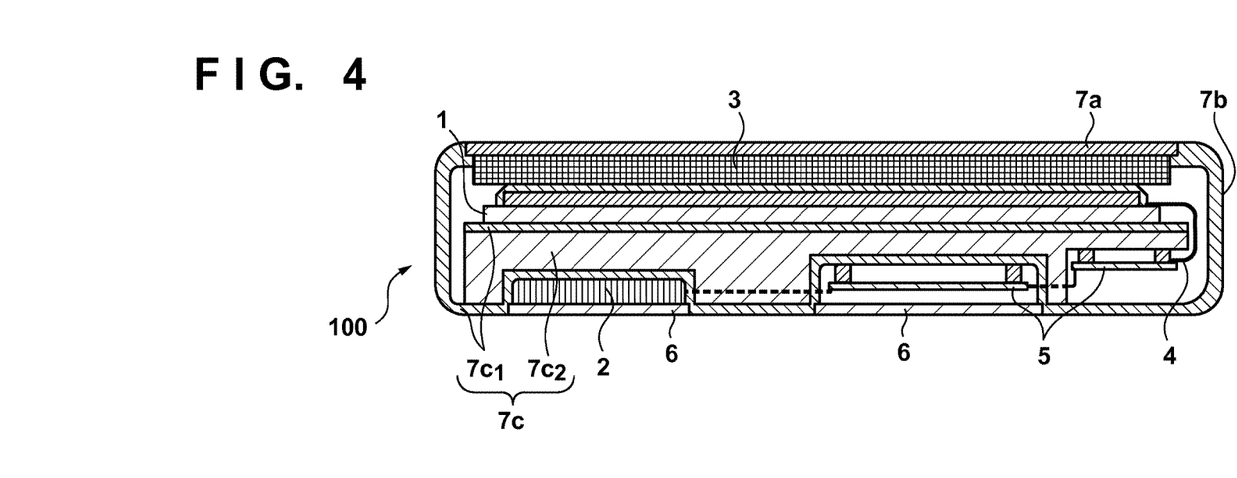
FIG. 4 is a longitudinal sectional view showing a radiation imaging apparatus according to the second embodiment.
Figure 5:
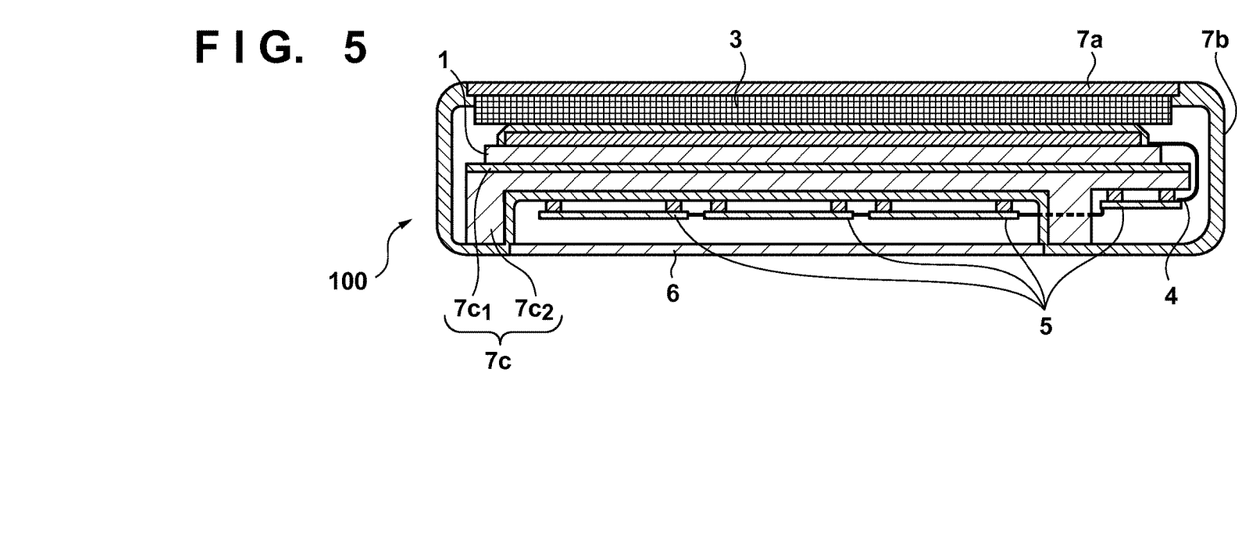
FIG. 5 is a cross-sectional view showing the radiation imaging apparatus according to the second embodiment.

FIGS. 4 and 5 are sectional views showing an imaging apparatus 100 according to the second embodiment. FIG. 4 is a longitudinal sectional view taken along a line A-A in FIGS. 1A and 1B. FIG. 5 is a cross-sectional view taken along a line B-B. As in the first embodiment, a control board 5 that performs readout control of a radiation detection panel 1 and processing of an electric output is connected to the radiation detection panel 1 via a flexible circuit board 4, and a rechargeable battery 2 for supplying power is also arranged in the same manner.

In the first embodiment, the radiation detection panel 1 is supported by the bottom 7c of the housing 7 while omitting a base for supporting the radiation detection panel 1. In order to arrange the control board 5 and the rechargeable battery 2 while downsizing the imaging apparatus 100, concave structures are formed in the lower surface of the bottom 7c, and the access covers 6 form closed spaces. However, according to the first embodiment, further weight saving may be sometimes difficult because the housing 7 needs to ensure rigidity necessary for the imaging apparatus 100.

To perform further weight saving in comparison with the first embodiment, the imaging apparatus 100 according to the second embodiment adopts the following arrangement. In order to contain and support the radiation detection panel 1, as in the first embodiment, a housing 7 has, on the upper surface of a bottom 7c, a flat supporting surface that contains and supports the radiation detection panel 1. The bottom 7c has, in its lower surface, at least one concave portion for containing the control board 5 or the rechargeable battery 2.

In the first embodiment, the bottom 7c is constituted by a single-layer structure. To the contrary, in the second embodiment, the bottom 7c that supports the radiation detection panel 1 is constituted by a multilayer structure, as shown in FIGS. 4 and 5. The bottom 7c in the second embodiment has a sandwich structure in which skin layers $7c_1$ sandwich the two surfaces of a core layer $7c_2$. The skin layer $7c_1$ arranged on the upper surface side of the bottom 7c forms a flat surface. At least one concave portion is formed in the lower surface of the core layer $7c_2$. The concave portion can be formed by a method of thinning the core layer $7c_2$. The skin layer $7c_1$ can be formed from a highly rigid fiber-reinforced resin or fiber-reinforced metal, or a metal alloy such as an aluminum alloy or magnesium alloy. The core layer $7c_2$ can be constituted by a foamed resin, or a structure of an aluminum alloy, resin, or the like having a honeycomb structure or lattice structure.

The core layer $7c_2$ has very low elasticity and low specific gravity. It is therefore difficult to ensure satisfactory rigidity using only the core layer $7c_2$. However, the total bending rigidity is improved by sandwiching the core layer $7c_2$ between the highly rigid skin layers $7c_1$. Since the core layer $7c_2$ is less rigid, the skin layer $7c_1$ on the lower surface side can also be constituted to similarly follow the concave portion, as shown in FIGS. 4 and 5, when forming the concave portion. This can reduce an abrupt change of the bending rigidity of the sandwich structure.

A case in which the bending rigidity of the sandwich structure abruptly changes without employing the above-described structure will be examined. In this case, a glass substrate constituting the sensor substrate supported by the bottom 7c may be locally distorted by an external force near a portion at which rigidity abruptly changes, and stress concentration may occur. Even if the overall imaging apparatus 100 has satisfactory rigidity, the glass substrate may be broken.

The bending rigidity of the bottom 7c of the sandwich structure is set to be higher than the bending rigidity of the top 7a serving as a radiation incident surface. This can relax the load of a tensile stress generated by a bending stress to the glass substrate, so further weight saving is easily performed. In the second embodiment, as in the first embodiment, access covers 6 are arranged to cover the concave portions, making it possible to ensure electrical safety and replace electric components such as the control board 5 and the rechargeable battery 2. To suppress the influence of a warp or the like caused by heat, the access cover 6 can be made of the same material as that of the skin layer $7c_1$ or the material of the multilayer structure.

With these configurations, while ensuring the rigidity of the imaging apparatus 100, a structure for arranging electric components necessary for the imaging apparatus 100 can be ensured. Further weight saving, thinning, and downsizing of the imaging apparatus 100, which are difficult in the related art, can be performed.

[Third Embodiment]

Figure 6A:
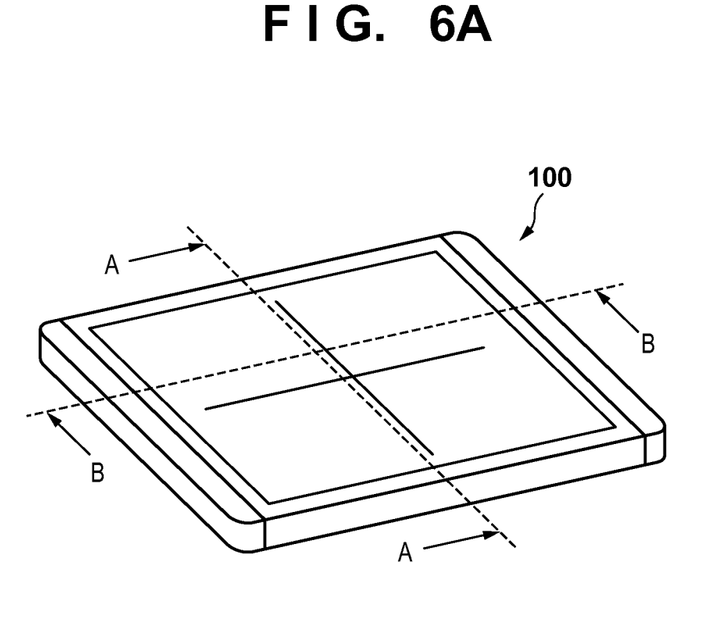
FIGS. 6A and 6B are views showing the outer appearance of a radiation imaging apparatus according to the third embodiment.
Figure 6B:
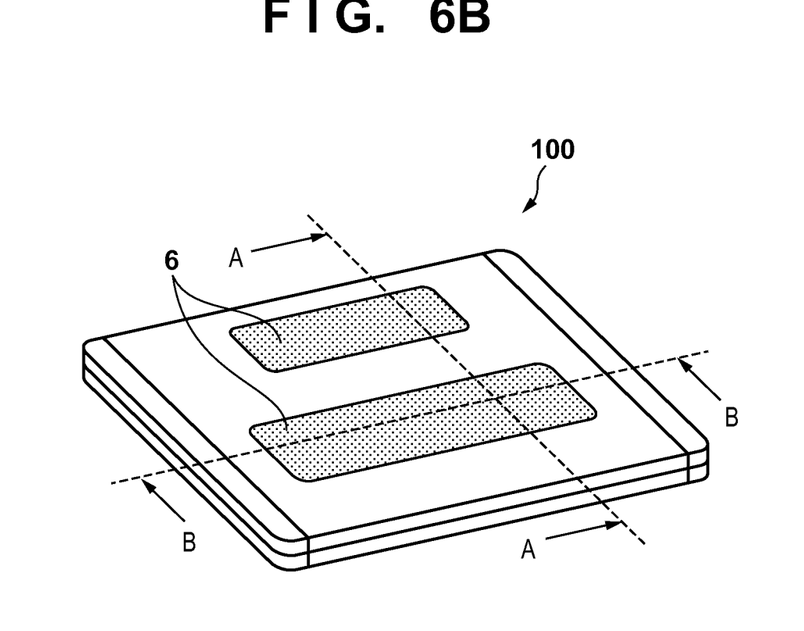
Figure 7:
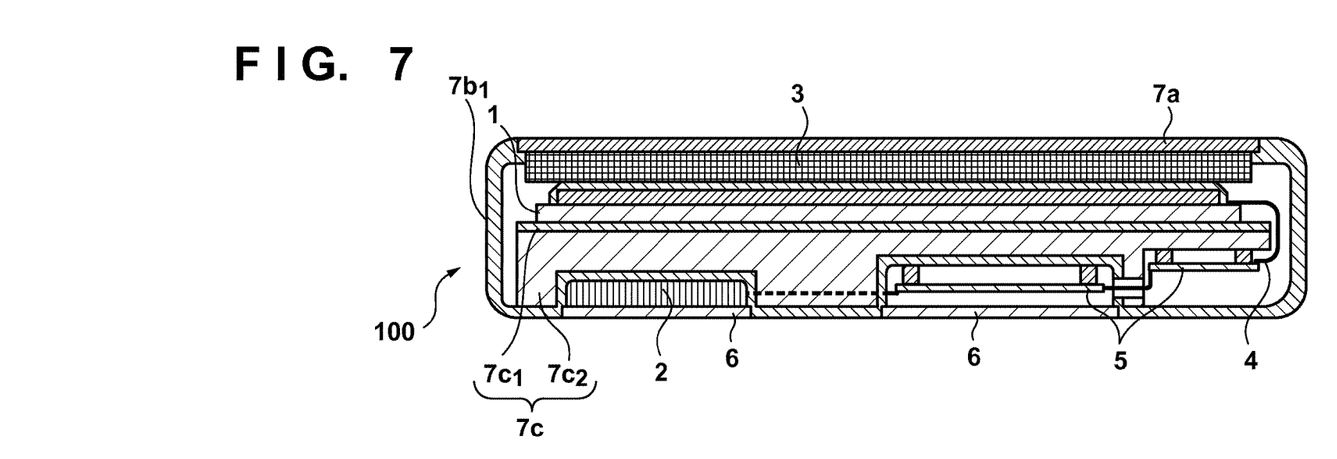
FIG. 7 is a longitudinal sectional view showing the radiation imaging apparatus according to the third embodiment.
Figure 8:
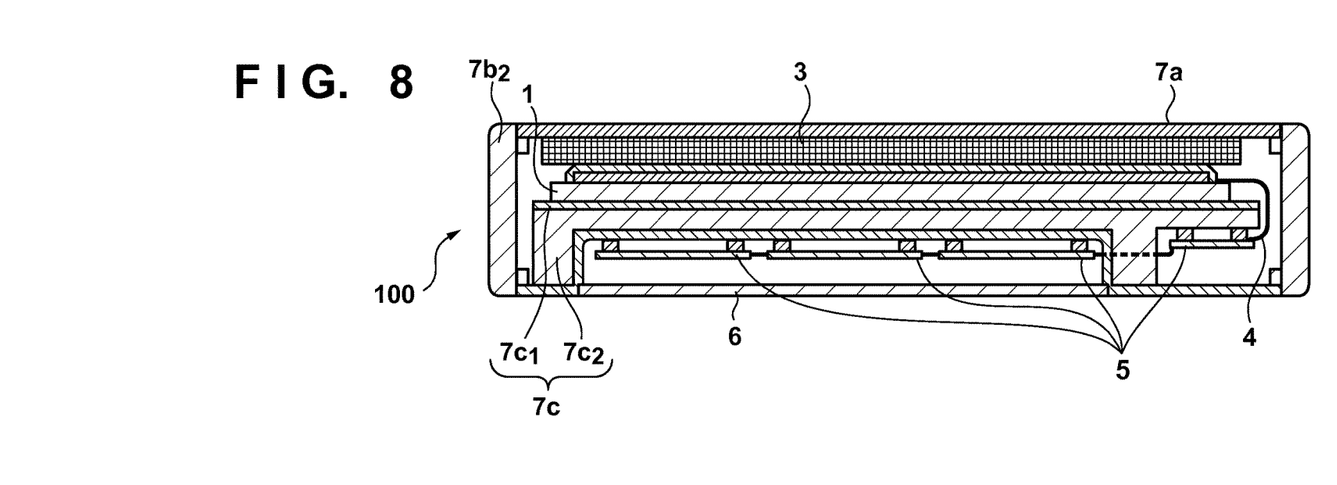
FIG. 8 is a cross-sectional view showing the radiation imaging apparatus according to the third embodiment.

In the first and second embodiments, the top 7a of the housing 7 can be detached, as shown in FIG. 2 and the like. However, the detachment structure of the housing 7 is not limited this. The third embodiment employs a structure in which a housing 7 can easily suppress the torsion of an imaging apparatus 100. To perform weight saving while suppressing the torsion, the imaging apparatus 100 according to the third embodiment adopts the following arrangement. FIGS. 6A and 6B show the outer appearance of the imaging apparatus 100 according to the third embodiment. FIG. 6A is a view showing an outer appearance when viewed from a side on which a radiation enters the imaging apparatus. FIG. 6B is a view showing an outer appearance when viewed from a side opposite to the radiation incident side. FIGS. 7 and 8 are a longitudinal sectional view taken along a line A-A in FIGS. 6A and 6B, and a cross-sectional view taken along a line B-B, respectively. In the third embodiment, a side 7b includes a pair of first (e.g. opposing) sides $7b_1$ and a pair of second (e.g. opposing) sides $7b_2$.

As shown in FIG. 7, the housing 7 has a monocoque structure having a rectangular-cylinder shape with a pair of opening portions, in which a top 7a and a bottom 7c are connected by the pair of first sides $7b_1$. The pair of second sides $7b_2$ are detachably attached to the pair of opening portions of the monocoque structure, and can close the housing, thus forming a closed space of the inside of the housing 7. By detaching the second sides $7b_2$ from the monocoque structure, the pair of opening portions of the side 7b of the housing 7 is open. A radiation detection panel 1 can be inserted into the housing 7 via the opening portions. The monocoque structure formed from the top 7a, the bottom 7c, and the pair of first sides $7b_1$ can be created by autoclave moulding or the like using a fiber-reinforced resin or the like.

As in the first and second embodiments, the radiation detection panel 1 is supported by the flat upper surface of the bottom 7c, and at least one concave portion is formed on the lower surface side of the bottom 7c. As shown in FIGS. 7 and 8, the bottom 7c according to the third embodiment can take a multilayer structure (sandwich structure), as in the second embodiment. Of course, the third embodiment may have a single-layer bottom portion structure in an alternative. Even in the former case, a skin layer $7c_1$ can be formed from a highly rigid fiber-reinforced resin or fiber-reinforced metal, or a metal alloy such as an aluminum alloy or magnesium alloy. A core layer $7c_2$ can be constituted by a foamed resin, or a structure of an aluminum alloy, resin, or the like having a honeycomb structure or lattice structure. As in the second embodiment, the bending rigidity of the bottom 7c is set to be higher than the bending rigidity of the top 7a. This can relax the load of a tensile stress generated by a bending stress to the glass substrate, so further weight saving is easily performed.

Electrical components such as a control board 5 and a rechargeable battery 2 can be arranged in concave portions formed in the housing 7. Access covers 6 are arranged at these concave portions so that electrical safety can be ensured and electrical components can be replaced. With these configurations, the imaging apparatus 100 according to the third embodiment ensures rigidity of the entire housing 7. Hence, while achieving the ensuring of rigidity, and weight-saving, thinning, and downsizing, a structure for arranging electrical components necessary for the imaging apparatus 100 can be ensured. Further weight-saving, thinning, and downsizing of the imaging apparatus 100, which are difficult in the related art, can be performed.

[Radiation Imaging System]

Figure 9:
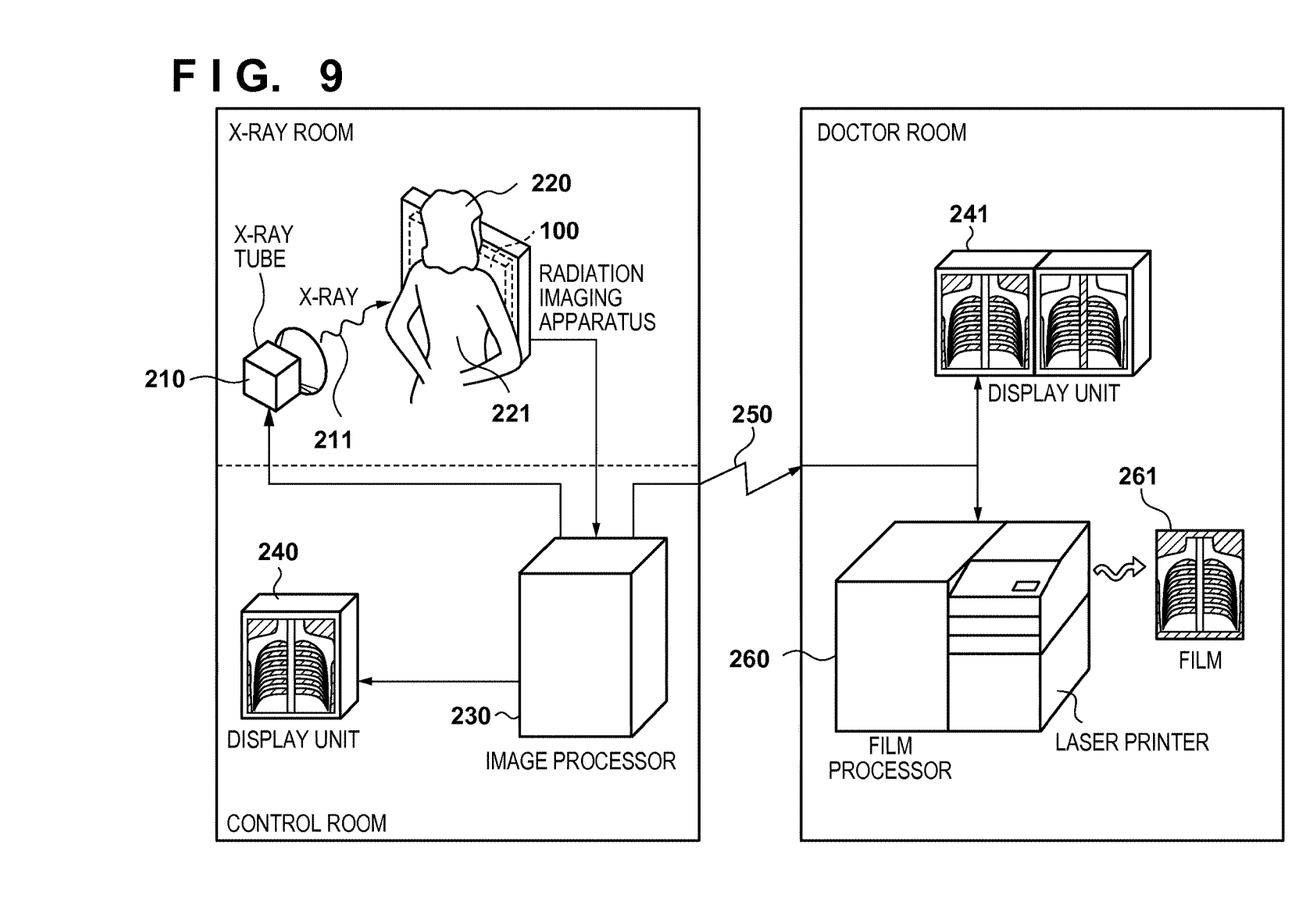
FIG. 9 is a view for explaining a radiation imaging system.

FIG. 9 shows a radiation imaging system including the above-described radiation imaging apparatus 100. As shown in FIG. 9, X-rays (radiation) 211 generated by an X-ray tube (radiation source) 210 pass through a chest 221 of a patient or subject 220 to be examined, and enter the radiation imaging apparatus 100. The incident X-rays include information about the inside of the body of the patient 220. A scintillator emits light in correspondence with the entrance of the X-rays, and a sensor (photoelectric converter) of a sensor panel photoelectrically converts the light, obtaining electrical information. This electrical information is digitized, undergoes image processing by a signal processing unit (image processor) 230, and can be observed on a display unit 240.

The information having undergone image processing by the image processor 230 can be transferred to a remote place by a transmission processing unit 250 such as a network (for example, telephone, LAN, or Internet). The information having undergone image processing by the image processor 230 can be displayed on a display unit 241 in a doctor's room or such another place, or can be saved on a recording unit such as an optical disk. A doctor at the remote place can make a diagnosis. The information having undergone image processing by the image processor 230 can also be recorded on a film 261 by a film processor 260.

The radiation detection apparatus according to the present invention is applicable to a medical radiation detection apparatus, and an apparatus for analysis and inspection using a radiation, such as a non-destructive inspection apparatus other than a medical one.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-080492, filed Apr. 9, 2014, which is hereby incorporated by reference herein in its entirety.

What is claimed is:

1. A radiation imaging apparatus comprising:
a radiation detection panel configured to detect radiation;
an electrical component electrically connected to the radiation detection panel;
a housing configured to house the radiation detection panel, the housing comprising a first portion through which radiation passes to enter the radiation detection panel, and a second portion; and
a cover member, wherein
the radiation detection panel is arranged between the first portion and the second portion,
the second portion has a first surface that is exposed outside the housing, and a flat supporting surface on which the radiation detection panel is supported and which is at an opposite side of the first surface,
the second portion has a concave portion formed therein so that the second portion has uneven thickness, the concave portion being accessible from outside via an opening formed in the first surface, and at least part of the first surface surrounding the concave portion,
the electrical component is arranged in the concave portion, and
the cover member is arranged to cover the concave portion to close the opening.

2. The apparatus according to claim 1, wherein the second portion has a higher bending rigidity than the first portion.

3. The apparatus according to claim 1, wherein the second portion has a multilayer structure of a core layer and skin layers sandwiching the core layer.

4. The apparatus according to claim 3, wherein the skin layer is formed from one of a fiber-reinforced resin, a fiber-reinforced metal, and a metal alloy, and the core layer is formed from one of a foamed resin and a structure having a honeycomb structure and a lattice structure.

5. The apparatus according to claim 1, wherein the housing further includes a side wall that connects the first portion and the second portion.

6. The apparatus according to claim 5, wherein the side wall includes a pair of first side walls and a pair of second side walls, the second portion and the pair of first side walls forming a monocoque structure having a rectangular-cylinder shape with a pair of opening portions, and the respective paired second side walls being detachably attached to the respective paired opening portions.

7. The apparatus according to claim 5, wherein the first portion is detachable from the side wall and the second portion.

8. The apparatus according to claim 5, wherein the first portion contains a carbon-fiber-reinforced resin, and the side wall and the second portion contain at least one of a fiber-reinforced resin, a fiber-reinforced metal, and a metal alloy and are integrated with each other.

9. The apparatus according to claim 1, wherein the electrical component includes at least one of a control board configured to read out a detection signal from the radiation detection panel and a rechargeable battery configured to supply power to the radiation detection panel.

10. The apparatus according to claim 1, wherein the cover member and the electrical component are integrated.

11. The apparatus according to claim 1, wherein the cover member is formed from a non-conductive material.

12. The apparatus according to claim 1, wherein the cover member is formed from the same material as a material of the second portion.

13. The apparatus according to claim 1, wherein a buffer member is positioned between the first portion and the radiation detection panel.

14. A radiation imaging system comprising:
a radiation imaging apparatus defined in claim 1;
a signal processing unit configured to process a signal from the radiation imaging apparatus; and
a display unit configured to display the signal from the signal processing unit.

15. The apparatus according to claim 1, wherein the first surface comprises at least two concave portions, and the at least two concave potions are separated by the exposed portion.

16. The apparatus according to claim 1, wherein at least part of the first surface overlaps with the radiation detection panel when viewed from a radiation incident direction.

17. The apparatus according to claim 1, wherein a thickness of the second portion at the concave portion is less than that at another portion so as to support the radiation detection panel as a whole on the supporting surface.

18. The apparatus according to claim 1, wherein the supporting surface of the second portion directly supports the radiation detection panel.

19. A radiation imaging apparatus comprising:
a radiation detection panel configured to detect radiation;
an electrical component electrically connected to the radiation detection panel;
a housing configured to house the radiation detection panel, the housing comprising a first portion through which radiation passes to enter the radiation detection panel, and a second portion; and
a cover member, wherein
the radiation detection panel is arranged between the first portion and the second portion,
the second portion has a first surface that is exposed outside the housing, and the second portion is integrated with a supporting portion which is at an opposite side of the first surface so as to support the radiation detection panel as a whole on the supporting portion,
the second portion has a concave portion formed therein so that the second portion has uneven thickness, the concave portion being accessible from outside via an opening formed in the first surface, and at least part of the first surface surrounding the concave portion,
the electrical component is arranged in the concave portion, and
the cover member is arranged to cover the concave portion to close the opening.

20. The apparatus according to claim 19, wherein the supporting portion of the second portion is flat.

* * * * *